Oct. 31, 1933.    LE ROY S. DUNHAM    1,932,654
PRIMARY BATTERY CELL
Filed Nov. 23, 1929
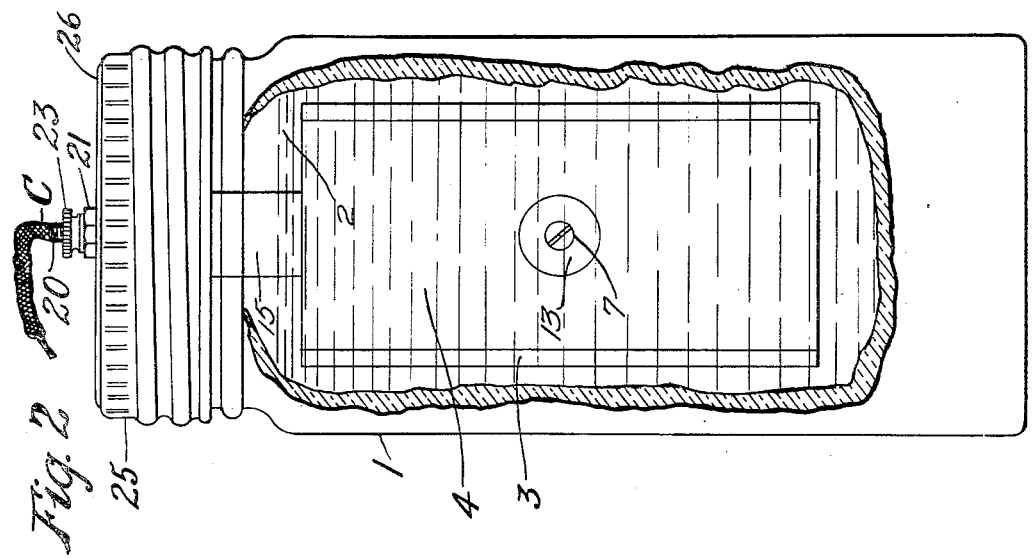
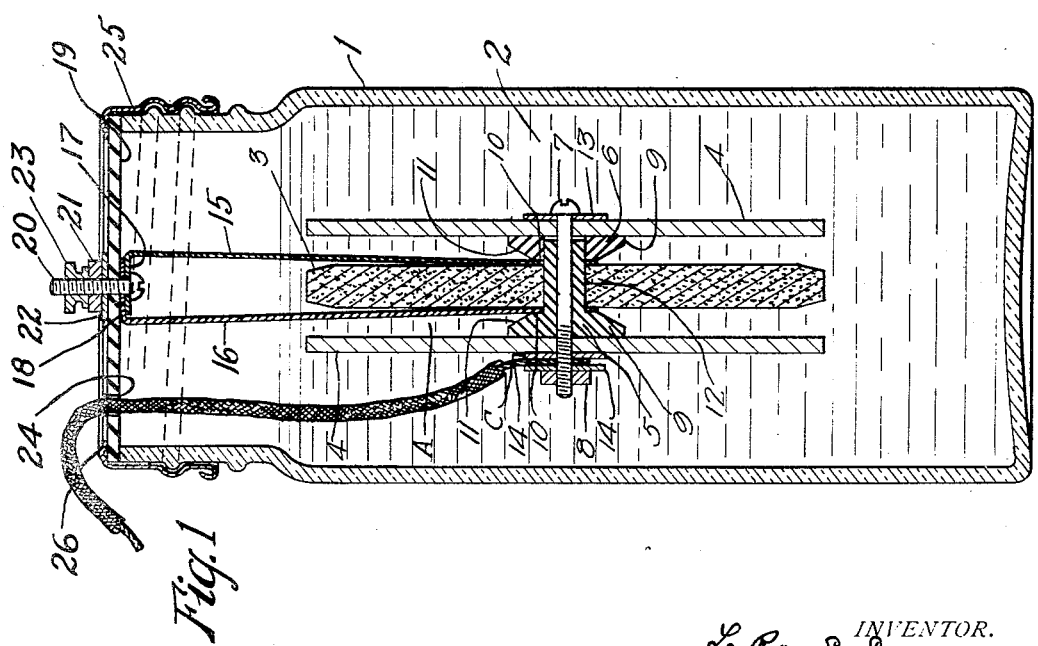
INVENTOR.
Le Roy S. Dunham
BY Henry Lanahan
ATTORNEYS.

Patented Oct. 31, 1933

1,932,654

UNITED STATES PATENT OFFICE 1,932,654

PRIMARY BATTERY CELL

Le Roy S. Dunham, East Orange, N. J., assignor to Thomas A. Edison, Incorporated, West Orange, N. J., a corporation of New Jersey Application November 23, 1929
Serial No. 409,249

2 Claims. (Cl. 136—81)

My invention relates to primary battery cells and more particularly to those of the type wherein a negative electrode consisting of an element or elements formed of a compound of copper, or other suitable depolarizing agent, and a positive electrode consisting of an element or elements of zinc are disposed in a caustic alkaline electrolyte such as a solution of caustic soda or caustic potash.

In primary battery cells of the type referred to the negative electrode elements are usually formed of black anhydrous cupric oxid, which is either properly molded and agglomerated in the form of plates or cylinders, or is packed within suitable perforated metallic containers, and while not limited thereto, my invention is especially directed to an improved primary battery cell of this character wherein the negative electrode consists of a molded plate or plates of cupric oxid each maintained between and in properly spaced relation to two positive zinc plates.

One of the objects of my invention is to provide an improved cell of this character which is of simple construction and efficient in operation and wherein the electrode element assembly comprises a minimum number of parts in addition to those composed of active electrode material.

Another object of my invention is to provide an improved and simple construction of the character described which is sufficiently inexpensive to manufacture as to be capable of being embodied in wet primary cells of small size and capacity adapted to be sold in competition with dry primary cells for many uses—such, for example, as in telephone circuits, special signal circuits, booster circuits, bell circuits, burglar alarms, etc.

A further object of my invention is to provide in a cell such as described, an improved construction for supporting the electrode elements and securing the same together in properly spaced and insulated relation, preferably comprising a novel form of insulating and supporting device for said elements, whereby a more rigid and stronger element assembly is obtained.

A still further object of my invention is to provide an electrode element assembly in which the arrangement is such as to render it practicable to employ positive plates of uniform thickness adapted to be stamped from rolled sheet zinc, in place of the expensive tapering plates of cast zinc usually employed, and also in which current generated by the cell flows for a minimum distance across the surfaces of the copper oxide negative plate or plates and it is therefore unnecessary to provide the edges of the latter with the usual copper-plated steel binding.

Yet another object of the invention is to provide a simple and novel construction for suspending the electrode element assembly from the cover of the cell container.

Other objects and features of my invention will be hereinafter more specifically described and claimed.

In order that my invention may be more clearly understood, attention is directed to the drawing accompanying and forming a part of this specification, and in which:

Fig. 1 is a central vertical sectional view, partly in elevation, of a primary battery cell embodying my invention; and Fig. 2 is a view in side elevation looking from the right in Fig. 1, with the cell container partly broken away.

Referring to the drawing, the battery jar or container 1, preferably formed of glass, is nearly filled with the electrolyte 2, preferably consisting of a solution of caustic soda or potash. The electrode element assembly A is disposed in the electrolyte 2 and supported, in a manner presently to be described, from the cover of the container 1. The element assembly shown comprises a single negative electrode element 3 preferably in the form of a rectangular plate of molded cupric oxid, and two rectangular zinc plates 4 slightly less in width than the plate 3 and respectively rigidly mounted at either side of the plate 3 in spaced and insulated relation thereto. The plates 3 and 4 are rigidly secured together in properly spaced and insulated relation by the spacing and insulating members 5 and 6, preferably formed of porcelain, and the bolt 7 which extends through said insulating members and also through said plates, preferably substantially centrally thereof, and has the nut 8 threaded thereon. Each of the spacing and insulating members 5 and 6 comprises a large cylindrical end portion 9 having an outer circular flat face for engagement with the respective adjacent zinc plate 4 and a conical portion 11 extending from said cylindrical portion and provided at its inner end with an annular flat face 10 of reduced diameter disposed adjacent the plate 3. The insulating member 5 has an integral cylindrical portion 12 of reduced diameter which extends from the annular face 10 of such member through an opening provided therefor in plate 3, preferably centrally of the latter, and also almost but not quite through an axial cylindrical opening in the insulating member 6. A suitable metal washer 13 is disposed between the head of the bolt 7 and the adjacent zinc plate 4, and two metal washers 14 are disposed on the opposite threaded end of the bolt between the nut 8 and the other zinc plate 4. The bolt 7 constitutes one terminal of the cell and one of the conductors C employed for conveying current from the cell, has one end thereof secured between the washers 14 in electrical connection with said bolt.

Two thin resilient copper-plated strips 15 and 16 of steel or other suitable conductive material, are respectively disposed at either side of the copper oxid plate 3, the lower end portions of said strips having openings through which the cylindrical extension 12 of the insulating member 5 extends and being held firmly against the plate 3 by the annular faces 10 of members 5 and 6 when the parts are secured together, as shown in Fig. 1, with the nut 8 of the bolt 7 turned up tightly. The strips 15 and 16 are provided at their upper ends with angular portions 17 and 18 which overlap and are disposed just beneath the cover 19 of the container 1. The electrode element assembly described is removably supported as a unit from the cover 19 of the container 1 and at a single point on such cover, by means of a bolt 20 which extends through openings provided therefor in the cover and in the angular portions 17 and 18 of the conductive strips 15 and 16, and a nut 21 threaded onto the upper extending end of the bolt. A suitable washer 22 is disposed on the bolt 20 between the nut 21 and the cover 19. The bolt 20 constitutes the other terminal of the cell, and one end of a conductor (not shown, but similar to the conductor C) is adapted to be secured to such bolt in electrical connection therewith between the nut 21 and a binding nut 23 threaded on the bolt. The conductor C secured to the bolt 7 extends upwardly through a suitable opening 24 in the cover 19. The cover 19 consists of a flat circular plate formed of suitable insulating material, such as hard rubber, and is removably but firmly secured against the top of the container 1 by means of an annular ring 25 threaded onto the upper end of the container and provided with an inwardly extending flange 26 overlying the edge portion of the cover.

It is apparent that if the nut 8 is turned up tightly on bolt 7, when the plates 3 and 4 and the parts associated therewith are assembled as shown in Fig. 1, all the parts of such assembly will be rigidly secured together with the negative plate 3 properly spaced and insulated from each of the positive plates 4, with the conductor C firmly held in good electrical connection with the bolt 7 and the positive plates 4, and with the lower end portions of strips 15 and 16 held by the inner faces 10 of members 5 and 6 in firm engagement and good electrical connection with opposite central face portions of the negative plate 3. The simple construction described, wherein the electrode plates are secured together at their centers, also results in an element assembly which is stronger and more rigid and in which there is far less likelihood of relative displacement of the free edge portions of the plates, than where the plates are secured together only at or adjacent their upper edges, as is the case in the usual form of plate electrode element assembly. Furthermore because the zinc plates 4 are supported at their central portions and the latter are most likely to last the longest in the operation of the cell, it is entirely practicable with my construction to use zinc positive plates of uniform thickness; accordingly I preferably form the plates 4 by stamping the same from rolled sheet zinc of a substantially given thickness. This has the advantage not only of economy in the amount of zinc used but such plates are much easier and less expensive to manufacture than the usual forms of zinc plates which are either tapered in vertical section or otherwise formed so as to be provided with relatively thick upper edge portions. Also by supporting the copper oxide plate 3 at its center, the current generated in the operation of the cell has to pass a minimum distance across the surfaces of such plate and accordingly I find that it is unnecessary to employ and therefore omit the usual copper-plated steel or other conductive binding for the edge portions of such plate.

The bolt 20 with its nut 21 and the strips 15 and 16 comprise simple means for effectively supporting or suspending the entire electrode element assembly within the container 1 from the cover 19 at a single point therein. With this construction, when the electrode plates become exhausted, the entire electrode element assembly may, if desired, be quickly replaced by a new one. In the structure described, it is also to be noted that the entire weight of the electrode plates or elements is borne by the spacing and insulating member 5 and is transmitted thereby and by the supporting means consisting of strips 15 and 16 and bolt 20, to the cover 19.

It is to be understood that the construction shown and specifically described herein is merely illustrative of a preferred embodiment of my invention, and that the same is subject to various modifications in form and arrangement of parts without departure from the spirit of my invention or the scope of the appended claims.

Having now described my invention, what I claim as new and desire to protect by Letters Patent is:

1. In a cell, an electrode assembly comprising a pair of positive plates, a negative plate disposed between the positive plates and means securing said plates together in spaced and insulated relation comprising a pair of insulating elements respectively disposed between opposite sides of the negative plate and the adjacent positive plate, each of said elements having an end face adjacent the respective positive plate and a smaller face adjacent the negative plate, one of said elements having a portion of reduced cross section extending from its smaller face through the negative plate and into the other insulating element, and a securing member extending through all said plates and said insulating elements.

2. In an electric cell, in combination, an electrode assembly comprising more than two plates, and means cooperating with said plates to maintain the same in spaced and assembled relation, said means comprising a plurality of insulating elements, each of said elements having a beveled portion interposed between two lateral faces of different cross sectional area, one of said elements having a projecting portion extending through an opening in an inner one of said plates, and another of said elements being slidably mounted in respect to said projecting portion between an inner and an outer one of said plates, the larger of said faces of each of said elements respectively being in intimate association with an outer one of said plates and the smaller of said faces of each of said elements being in intimate association with an inner one of said plates.   LE ROY S. DUNHAM.